United States Patent [19]

Hou et al.

[11] Patent Number: 4,921,654
[45] Date of Patent: May 1, 1990

[54] LOW PROTEIN BINDING MEMBRANE

[75] Inventors: Chung-Jen Hou, So. Windsor; James Disbrow, Meriden; Kenneth C. Hou, Glastonbury, all of Conn.

[73] Assignee: Cuno, Incorporated, Meriden, Conn.

[21] Appl. No.: 408,737

[22] Filed: Sep. 18, 1989

[51] Int. Cl.$^5$ .............................................. E01D 13/04
[52] U.S. Cl. ..................................... 264/45.5; 264/48
[58] Field of Search .......... 264/41, 45.1, 48, DIG. 48, 264/DIG. 62; 210/500.1, 500.2, 500.22, 500.27, 50.35–500.41

[56] References Cited

U.S. PATENT DOCUMENTS 4,377,010 3/1983 Fydelor et al. ................. 210/500.39

Primary Examiner—Frank Sever
Attorney, Agent, or Firm—Weingram & Zall

[57] ABSTRACT

A modified microporous membrane comprising an organic polymeric microporous membrane having microporous surfaces and having hydroxyl, mercapto, carboxyl, or amino functionality on the surfaces modified by a reactive modifying polymer having a polymer chain and having along the polymer chain epoxy or epithio functional groups capable of reacting with the functionality on the surface of the membrane and terminal neutral chemical functionality. The preferred reactive modifying polymer is made from a free radical polymerization of:

(a) a polymerizable compound containing an epoxy or epithio group capable of direct covalent coupling to the surface functionalities of the microporous membrane and a vinyl group capable of free radical polymerization; and (b)

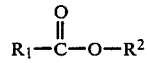

wherein $R_1$ is an alpha, beta ethylenically unsaturated polymerizable radical of two or three carbon atoms;

$R_2$ is an alkyl substituent of two to five carbon atoms having a terminal hydroxyl functionality or $(R_3O)_nH$, wherein $R_3$ is an alkyl substituent of two or three carbon atoms and n is 1 to 20.

The membranes have a relatively low-binding capacity for protein.

13 Claims, 6 Drawing Sheets

FIG. 1
FORMATION OF MODIFYING POLYMER
FOR MEMBRANE MODIFICATION
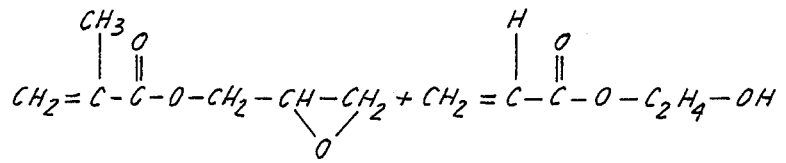
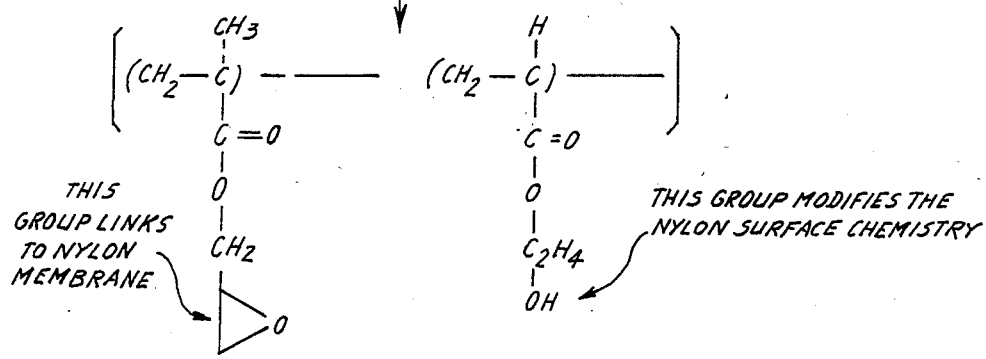
OTHER COMONOMERS (b)
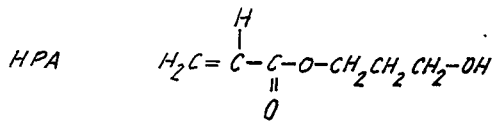
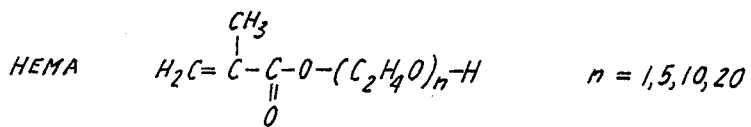  $n = 1, 5, 10, 20$
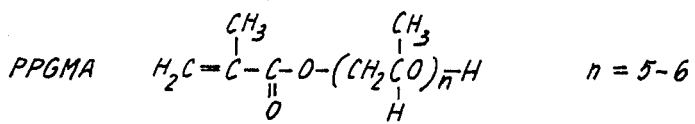  $n = 5-6$ EFFECT OF pH ON IgG BINDING TO MEMBRANE

COMPARISON OF PRIOR ART PALL BIO INERT VS. MODIFIED MEMBRANE

LOW PROTEIN BINDING MEMBRANE

BACKGROUND OF THE INVENTION

1. Field of the Invention

This invention relates to microporous membranes and more particularly to modified nylon membrane having a relatively low binding capacity for protein and which is suitable for the filtration of aqueous fluids, such as biological liquids containing proteins.

2. Prior Art

Microporous membranes are well known in the art. For example, U.S. Pat. No. 3,876,738 to Marinaccio, et al. (1975) describes a process for preparing a microporous membrane, for example, by quenching a solution of a film forming polymer in a non-solvent system for the polymer. European patent application No. 0 005 536 to Pall (1979) describes a similar process.

Commercially available microporous membranes, for example, made of nylon, are available from Pall Corporation, Glen Cove, N.Y. under the trademark ULTIPOR $N_{66}$. Such membranes are advertised as useful for the sterile filtration of pharmaceuticals, e.g. removal of micro-organisms.

Cationically charged membranes which are used for the filtration of anionic particulate contaminants are also known in the art. For example, charge modified filter membranes are disclosed in the Assignee's Japanese Patent No. 923649 and French Patent No. 7415733. As disclosed therein, an isotropic cellulose mixed ester membrane, was treated with a cationic colloidal melamine formaldehyde resin to provide charge functionality.

Assignee herein has also developed cationic charge modified microporous membranes for use in the filtration of fluids. These cationic membranes, their preparation and use are described in Barnes, et al. U.S. Pat. No. 4,473,475 and Ostreicher, et al. U.S. Pat. No. 4,473,474. Cationic charge modified nylon membranes covered by these inventions are now being sold by CUNO Incorporated under the trademark ZETAPOR. Pall Corp., Glen Cove, N.Y. is also selling a cationic charge modified nylon membrane under trademark $N_{66}$ POSIDYNE produced by the cocasting process. See Degen, et al. U.S. Pat. 4,702,804.

Anionically charged microporous filter membrane for the removal of fine charged particulates from liquids used for crossflow filtration are also known, see Chu, et al. U.S. Pat. No. 4,604,208.

However, most of these membranes, particularly nylon membranes, to a greater or lesser degree tend to bind proteinaceous materials, e.g., BSA, IgG, during filtration of fluids containing these proteins. It is theorized that this is due to the interaction of the residual charged groups on, for example, the nylon membrane with the protein molecules. This tends to clog the membranes more rapidly, increase pressure drop and, perhaps more importantly, remove desirable proteins from the solution being filtered.

For example, the DURAPORE hydroxyl-modified poly-vinylidene fluoride (PVDF) filter from Millipore, Inc., has been advertised frequently as a membrane of highest product recovery. Millipore's studies show that nylon membrane consistently binds 50–100 times more protein per sq. cm than DURAPORE.

Pall Corporation offers a product called Bio-Inert Membrane filter which is a hydrophilic hydroxyl-modified polyamide (nylon 66) membrane. The membrane is said to be " . . . too rich in covalent-linked hydroxyl groups, which are an integral component of the membrane . . . making it inherently hydrophilic and virtually passive to adsorption of protein." (Filtration News, Pall Corp., winter 1987) This membrane is claimed to bind less than 3–5 μg of protein per $cm^2$ filter area.

European patent application Publication No. 0272842 to Pall Corp. describes a porous polymeric medium having low protein affinity. More specifically, this reference describes coating nylon 66 with a condensation reaction of (a) a polymer having a plurality of hydroxyl moieties with (b) a cross-linking agent having radicals or other moieties capable of reacting with the hydroxyl moieties on the polymer, followed by curing. Examples of (a) are cellulose derivatives, hydroxyalkyl esters of cellulose and hydroxyalkyl esters of acrylic acid and methacrylic acid, e.g. polyhydroxyethyl methacrylate, polyvinyl alcohol and starch. Examples of (b) are compounds having acidic moieties, e.g. carboxylic acid groups and phenolic groups, as well as methylol compounds, resoles, amide groups and aldehydes, copolymers of acrylic acid and acrylamide, copolymers of acrylic acid and N-methylol acrylamide and polyacrylic acid.

Hou et al U.S. Pat. Nos. 4,663,163, 4,687,820 and 4,724,207 in their preferred embodiment describe polysaccharides, polypeptides and siliceous materials modified by a polymer of a reactive monomer such as glycidyl methacrylate (GMA) or glycidyl acrylate (GA), and another functional monomer such as diethylaminoethyl methacrylate (DEAE), or β-carboxy ethyl acrylate (β-CEA) to obtain an ion-exchange media for molecular separation or chromatography.

Of additional interest are the following U. S. patents:

| U.S. Pat. No. | Inventor |
| --- | --- |
| 4,377,100 | Fydelor et al |
| 4,618,533 | Steuck |
| 4,634,604 | Tlustakova et al |
| 4,702,840 | Degen et al |
| 4,765,897 | Cadotte et al |
| 4,778,596 | Linder et al |
| 4,828,700 | Fibiger et al |

Degen et al U.S. Pat. No. 4,707,266 discloses polyamide membranes produced by the cocasting method which may be useful for processing biological and biochemical preparations. The membranes are prepared from a casting solution comprised of an alcohol insoluble polyamide resin and a water soluble membrane surface modifying polymer. The surface modifying polymers may include hydroxy alkyl acrylates.

Tlustakova U.S. Pat. No. 4,634,604 discloses a method for producing a biocompatible layer on the surface of particulate sorbent material. The biocompatible layer is a homopolymer or copolymer of 2-hydroxyethyl methacrylate.

Fydelor et al U.S. Pat. No. 4,377,010 discloses a biocompatible device comprising a base polymer having a surface of a graft copolymer selected from acrylic acid and alkyl substituted acrylic acids.

The remainder of the aforecited patents generally disclose separation membranes which are coated, encapsulated or surface modified with a polymeric compound. Cadotte et al U.S. Pat. No. 4,765,897 and Fibiger et al U.S. Pat. No. 4,828,700 disclose a polyamide reverse osmosis membrane which may be treated with a rejection enhancing agent which may comprise a copolymer of hydroxyethyl methacrylate with methacrylate acid.

Steuck U.S. Pat. No. 4,618,533 (Millipore Corp.) describes modifying microporous membranes which are hydrophobic to make them hydrophilic with hydroxy alkyl acrylates or methacrylates cross-linked with difunctional acrylates or methacrylates, e.g., glycidyl acrylate.

It is thus desirable to modify the surfaces, in particular the microporous microstructure, of such membranes to achieve effective removal of impurities from protein containing solutions without altering product yield, i.e. removing protein. Such a modified membrane must not have excessive extractables, the pore structure should not be altered or blocked, the modifying agent must be bio-compatible and non-toxic and the membrane's physical-mechanical properties must not be detrimentally effected by such modification.

OBJECTS AND SUMMARY OF THE INVENTION

It is an object of this invention to provide a novel modified microporous membrane, particularly suitable for the filtration of biological or parenteral liquids which has low protein binding capacity.

It is a further object of this invention to provide a process for modifying a hydrophilic organic polymeric microporous membrane to produce a low protein binding membrane.

It is another object of this invention to provide an isotropic modified microporous nylon membrane which has low extractables suitable for the filtration of biological or parenteral liquids and has a low binding capacity for protein.

It is yet another object of this invention to prepare a sanitizable or sterilizable nylon microporous membrane for the efficient removal of contaminants from liquids, which has a low capacity for binding protein.

It is still another object of this invention to provide a modified nylon microporous membrane which has improved physical properties.

It is another object of this invention to provide a modified microporous membrane produced by post-treatment of a preformed hydrophilic membrane with a modifying polymer without substantial pore blockage or decrease in hydrophilicity.

It is a further object of this invention to provide a modified nylon microporous membrane which has enhanced hydrophilicity.

These and other objects of this invention are attained by a novel modified microporous membrane. The membrane of this invention comprises an organic polymeric microporous membrane having microporous surfaces and having hydroxyl, mercapto, carboxyl or amino functionality on the surfaces modified by a reactive modifying polymer. The modifying polymer is a polymer chain having along the polymer chain epoxy or epithio functional groups capable of reacting with the functionality on the surface of the membrane and terminal neutral chemical functionality.

This invention is further directed to a process for producing said membrane by applying to the membrane the aforesaid modifying polymer. Preferably the process for modifying the membrane comprises contacting the membrane with solutions of the polymer and then curing the membrane to react or bond the polymer to the microporous membrane surfaces. Optionally, the modified membrane may be made by cocasting the modified polymer with the organic polymer used to produce the microporous membrane.

The preferred microporous membrane is nylon, particularly nylon 66, i.e. polyhexamethylene adipamide. The preferred modifying polymer is a reaction of product of glycidyl methacrylate (GMA) and 3-hydroxypropyl acrylate (HPA). The modified microporous membrane of this invention may be used for the filtration of fluids, particularly parenteral or biological liquids containing proteins.

BRIEF DESCRIPTION OF THE FIGURES

FIG. 1 is a schematic drawing of the formation of the modifying polymer used for membrane modification and other monomers for use in forming the polymer.

DETAILED DESCRIPTION OF THE INVENTION

Figure 2:
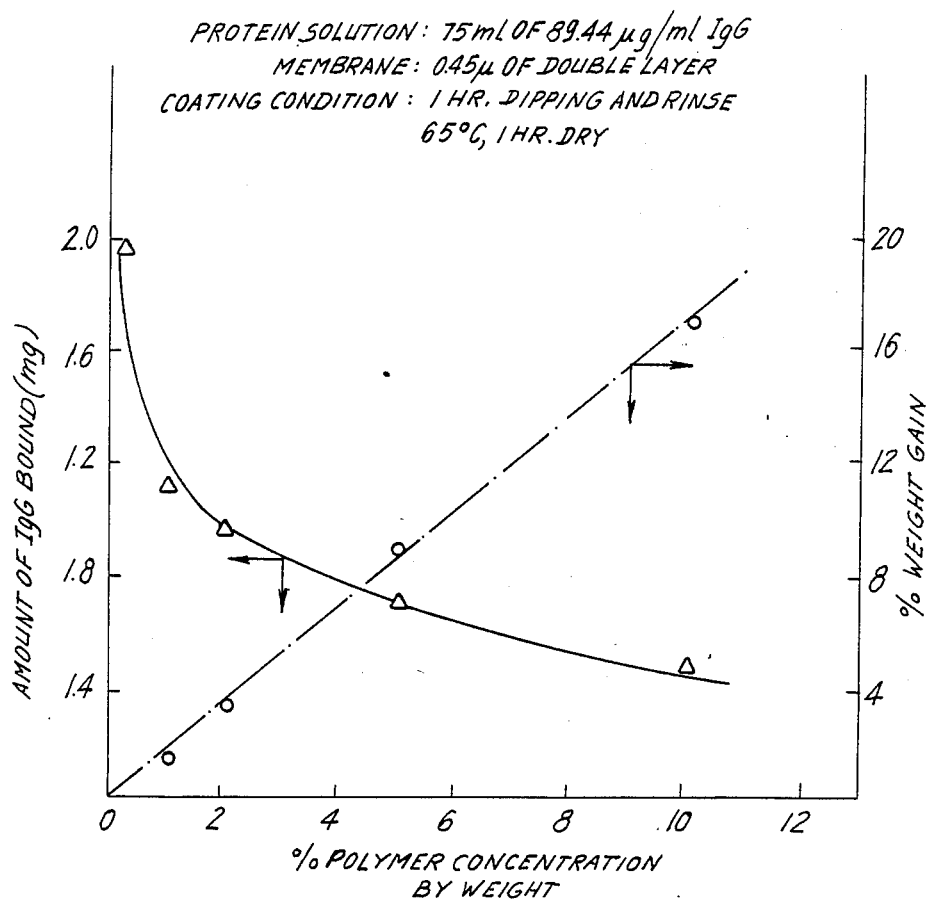
FIG. 2 is a graph entitled "Effect of Polymer Concentration"; see Example 13.

The modified microporous membrane of this invention is preferably produced from a hydrophilic organic polymeric microporous membrane and most preferably nylon 66. Such membranes are well known in the art.

By the use of the term "microporous membrane" as used herein, it is meant a substantially symmetrical, substantially isotropic porous membrane having a pore size of at least 0.05 microns or larger or an initial bubble point (IBP), as that term is used herein, in water of less than 120 psi. A maximum pore size useful for this invention is about 1.2 micron or an IBP of greater than about 10 psi. By "symmetrical" it is meant that the pore structure is substantially the same on both sides of the membrane. A number of commercially available membranes not encompassed by the term "microporous membrane" are "asymmetric", i.e. having one side formed with a very light thin layer which is supported by a much more porous open structure. By the use of the term "isotropic", it is meant the membrane has a uniform pore structure throughout the membrane.

By the use of the term "hydrophilic" in describing the microporous membrane, it is meant a membrane which adsorbs or absorbs water. Generally, such hydrophilicity is produced by a sufficient amount of hydroxyl (OH-), carboxyl (-COOH), amino (NH$_2$) and/or similar functional groups on the surface of the membrane. Such groups assist in the adsorption and/or absorption of the water onto the membrane. Such hydrophilicity of the membrane is a necessary element of this invention to provide the adequate bonding of the modifying polymer through the epoxy or epithio substituent to the microporous membrane.

A preferred microporous membrane is one produced from nylon. The term "nylon" is intended to embrace film forming polyamide resins including copolymers and terpolymers which include the recurring amido grouping.

While, generally, the various nylon or polyamide resins are all copolymers of a diamine and a dicarboxylic acid, or homopolymers of a lactam of an amino acid, they vary widely in crystallinity or solid structure, melting point, and other physical properties. Preferred nylons for use in this invention are copolymers of hexamethylene diamine and adipic acid (nylon 66), copolymers of tetramethylene diamine and adipic acid (nylon 46) copolymers of hexamethylene diamine and sebacic acid (nylon 610), and homopolymers of poly (caprolactam) (nylon 6).

Alternatively, these preferred polyamide resins have a ratio of methylene ($CH_2$) to amide (NHCO) groups within the range about 5:1 to about 8:1, most preferably about 5:1 to about 7:1. Nylon 6 and nylon 66 each have a ratio of 6:1, whereas nylon 610 has a ratio of 8:1.

The nylon polymers are available in a wide variety of grades, which vary appreciably with respect to molecular weight, within the range from about 15,000 to about 42,000 and in other characteristics.

The highly preferred species of the units composing the polymer chain is polyhexamethylene adipamide, i.e. nylon 66, and molecular weights in the range above about 30,000 are preferred. Polymers free of additives are generally preferred, but the addition of antioxidants or similar additives may have benefit under some conditions.

The preferred membrane substrates are produced by the method disclosed in Marinaccio, et al. U.S. Pat. No. 3,876,738 Another method of producing such membranes is described in European patent application No. 0 005 536 to Pall. The entire disclosures of both of these references are incorporated herein by reference.

Additionally, any of the hydrophilic microporous membranes commercially available, for example, Pall Corp.'s ULTIPOR $N_{66}$ (nylon), or Cuno, Inc.'s nylon microporous membrane having characteristics potentially suitable for fine filtration of fluids, particularly aqueous systems, are suitable for treatment in accordance with this invention.

These preferred nylon membranes, i.e. described in Marinaccio, et al. and Pall, are characterized by an isotropic structure, having a high effective surface area and a fine internal microstructure of controlled pore dimensions with narrow pore size distribution and adequate pore volume. For example, a representative 0.22 micrometer rated nylon 66 membrane (polyhexamethylene adipamide) exhibits an initial bubble point (IBP) of about 45 to 50 psid, a foam all over point (FAOP) of about 50 to 55 psid, provides a flow of from 70 to 80 ml/min of water at 5 psid (47 mm. diameter discs), has a surface area (BET, nitrogen adsorption) of about 13 $m^2/g$ and a thickness of about 4.5 to 4.75 mils.

The polymer which modifies the membrane may be a homopolymer or a copolymer, with copolymers being preferred. However, polymers wherein polymerizable compounds, (a) and (b) herein, are the same, are within the scope of the present invention. The definition of the polymer as a homo- or copolymer depends on whether the polymerizable compound making up the polymer is the same or different. In its most general form, the copolymer may be a random, a block, or an alternating copolymer.

Generally and preferably, the modifying polymer is a polymer comprising the polymerization product of (a) a polymerizable compound which has a chemical group capable of direct or indirect covalent coupling to the surface functional groups of the membrane with (b) one or more polymerizable compounds having a terminal neutral substituent.

Comonomer (a), above, preferably contains vinyl unsaturation to promote polymerization and/or copolymerization with other monomers and, at the same time, contains a group capable of covalent bonding to the microporous membrane through the hydroxyl, mercapto, carboxyl and amino substituents on the membrane. Preferred groups for covalently bonding to the membrane include glycidyl groups. Among the compounds containing a glycidyl group are the ethers or esters formed between a glycidyl alcohol and an unsaturated alcohol or unsaturated carboxylic acid. Typical glycidyl alcohols are aliphatic and cyclo-aliphatic alcohols and ether alcohols having from 3 to 18 carbon atoms which are esterified with an alpha, beta-unsaturated carboxylic acid, preferably acrylic or methacrylic acid, or are etherified with olefinically or acetylenically unsaturated alcohol. Preferred compounds are glycidyl acrylate (GA) and glycidyl methacrylate (GMA). Other comonomer (a) compounds may be 4-5-epoxy-pentyl acrylate; 4-(2,3-epoxy propyl)-N-butyl methacrylate; 9,10-epoxystearyl acrylate; 4-(2,3-epoxy propyl)cyclohexyl methacrylate; ethylene glycol-monoglycidylether acrylate, allyl glycidyl ether, N-acryloyl-oxysuccinimide, N-methacyrloyloxysuccinimide, 2,3 epithiopropyl acrylate, 2,3 epithiopropyl methacrylate, and the like.

Comonomer (b) is a polymerizable unsaturated compound carrying neutral, i.e. uncharged, chemical groups such as hydroxyl groups, amide groups, alkyl groups, aryl groups and the like. Preferred among comonomers (b) are $C_1-C_6$ alkyl acrylates or methacrylates, or the corresponding hydroxy alkyl acrylates or methacrylates. The function of comonomer (b) is to decrease the bonding of proteins to the polymers, so as to provide the desired inhibition of protein binding.

Generally, the preferred comonomer (b) is

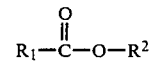

wherein $R_1$ is an alpha, beta ethylenically unsaturated polymerizable radical of two or three carbon atoms;

$R_2$ is an alkyl substituent of two to five carbon atoms having a terminal hydroxyl functionality or $(R_3O)_nH$, wherein $R_3$ is an alkyl substituent of two or three carbon atoms and n is 1 to 20.

Preferred comonomer (b) components are 2-hydroxy acrylate, 2-hydroxyethyl acrylate (HEA), 3-hydroxypropyl acrylate (HPA), poly(ethylene glycol) mono-acrylate, poly(ethylene glycol) monomethacrylate and hydroxyethyl methacrylate and isomers thereof.

The minimum ratio of comonomer (a) to total comonomer content is important. The synthetic polymer should have a sufficient amount of comonomer (a) to permit substantial covalent coupling of the modifying polymer to the membrane. If too little comonomer (a) is present in the polymer, then grafting becomes difficult, if not impossible. Generally, about 4% to 20%, preferably 5% to 10% by weight of comonomer (a) relative to the total of (a) plus (b) is needed.

The free radical addition polymerization of free radical polymerizable comonomers (a) and (b) is carried out with free radical initiators using the steps of initiation, addition and termination. Such procedures are well known in the art. A preferred procedure is to utilize a substance or substances which produce radicals capable of reacting with the monomers. Probably the simplest of all polymerization initiators are the organic peroxides and azo compounds. These substances decompose spontaneously into free radicals in common organic solvents at a finite rate, at temperatures between 50° and 140° C. For example, benzoyl peroxide decomposes into two benzoyloxy radicals at 60° C. Another example is afforded by the azo compound azo-bisisobutyronitrile (AIBN) which similarly decomposes into radicals at easily accessible temperatures.

The necessary energy may also be provided by irradiating the initiator system with ultraviolet light. For example, initiation can be provided by irradiating the initiator system in the presence of photo initiators such as benzophenone and its derivatives, benzoin alkyl ethers or derivatives, or acetophenone, with ultraviolet light. It is then necessary that the initiator molecules absorb in the spectral region supplied. In this way radicals can be generated at a finite rate at considerably lower temperatures than are necessary if purely thermal excitation is used. Finally, bimolecular reactions may produce radicals capable of initiating polymerization. Particularly important are the redox reactions, which occur in aqueous media, and involve electron transfer processes. For example, the system Fe(II) plus hydrogen peroxide, or Ag(I), plus $S_2O_8$ —are particularly important in initiating the radical polymerization of monomers. Because of the low temperature of initiation, the redox initiators or photochemically induced initiators are particularly preferred in the present invention. The amount of initiator is that sufficient to initiate the polymerization reaction. Polymerization is carried out until substantially all of the monomers or comonomers have been incorporated into the polymeric chains. This can be readily ascertained by simple analytical tests on the reaction mixture. Preferably, this polymerization is accomplished just prior to the covalent coupling of the polymer to the membrane. Preferably, the coupling and polymerization are performed in the same liquid phase.

The most preferred method of carrying out the process is in a "one-pot" system. All desired comonomers are added to an inert solvent system, such as, e.g., water, alcohols, organics, and the like, preferably producing a clear coating solution of the modifying polymer. Preferred solvents are N-methyl 2-pyrrolidone, dioxane, N,N-di-methyl formamide. The comonomers are treated under conditions which will initiate polymerization of the comonomers. This can be accomplished, for example, by adding an initiator, e.g. azo-bis-isobutyronitrile (AIBN) to a well stirred mixture of monomers in N,N-di-methyl formamide, and initiating polymerization from about 60° C. to 85° C. Alternatively, a photolabile initiator can be added and initiation caused by photochemical means. After stirring for a time sufficient to allow the polymerization to proceed to completion, the linking of the formed copolymer to the membrane is caused by applying the modifying polymer to the membrane causing condensation of the modifying polymer to the membrane.

The preferred method of applying the polymer to the membrane is coating the membrane by dipping the membrane in the polymer or spraying, brushing, etc. the membrane with the polymer. Optionally, the modifying polymer may be applied to the membrane by cocasting the modifying polymer with the polymer used to form the membrane. Such methods are well known in the art of charge modified nylon membrane; see, for example, the aforecited Degen et al patents (U.S. Pat. Nos. 4,702,840 and 4,707,266), all of which are incorporated herein by reference.

In the case when the linking group on the copolymer is a glycidyl group, it may be desirable to heat the polymer to cause such condensation; such temperature is normally around 80°-120° C. or higher. Reaction time is then allowed to proceed for a time sufficient to either go to completion, or to achieve modification of the membrane to the desired performance.

The product is then washed and dried for further treatment, if necessary. Unreacted monomers, oligomer and polymer can be washed away with a good solvent.

The amount of modifying polymer used is an amount sufficient to inhibit the capture of proteinaceous material on the membrane. Such an amount is highly dependent on a specific modifying agent utilized and the membrane modified.

The weight ratio of reactive polymer membrane to the membrane is freely adjustable, and varies from 0.1 to 25% by weight.

Broadly, the process of this invention is directed to modifying a hydrophilic organic polymeric microporous membrane, e.g. nylon to inhibit the capture of proteinaceous material on said membrane.

The process comprises applying to the membrane a modifying amount of the aforesaid modifying polymer. Preferably the membrane is contacted with the modifying polymer.

Although Applicants do not wish to be bound by the following theory, it is believed that in the bonding the modifying polymer agent to the microporous membrane the epoxy or epithio groups on the polymer enter into addition type reactions with the hydroxyl, carboxyl and primary and secondary amines, which are on the hydrophilic microporous membrane. These reactions may be represented as follows:

Hydroxyl

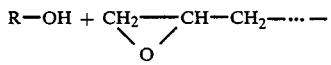

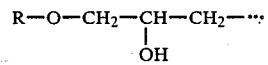

Carboxyl

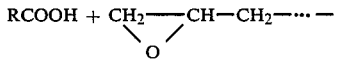

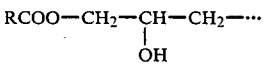

Amine

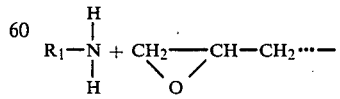

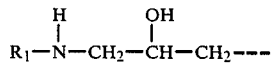

or

-continued

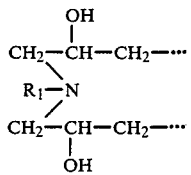

FIG. 1 depicts what is believed to be a typical chemical reaction between comonomer (a), e.g., glycidyl methacrylate (GMA), and comonomer (b) 2-hydroxyethyl acrylate (HEA) to produce the modifying polymer. Other comonomer (b) components are also chemically depicted.

After the microporous membrane has been contacted with the modifying polymer solution it is then dried and cured preferably in a restrained conditioned to prevent shrinkage.

Drying of the membrane under restraint is described in the Assignee's copending Defensive Publication No. T-103,601. The entire disclosure of this Application is incorporated herein by reference. Generally, any suitable restraining technique may be used while drying, such as winding the membrane tightly about a drying surface, e.g. a drum. Biaxial control is preferred and tensioning of the membrane on a stretching frame is considered the most preferred. Preferably, the restraint imposed effects no reduction in dimensions.

Final drying and curing temperature should be to dry and cure the treated membranes, preferably from about 90° C. to about 140° C. for minimization of drying times without embrittlement or other detrimental effects to the membrane.

The completed membrane may be rolled and stored for use under ambient conditions. It will be understood that the treated membranes may be supplied in any of the usual commercial forms, for example, as disks or pleated cartridges. The present invention provides an integral coherent microporous membrane of retained internal poor geometry. The modified membrane has a filtration ratings substantially similar to that of the untreated membrane but the binding of proteinaceous material to the membrane is minimized.

For so-called sterile filtrations involving biological liquids, the filter is sanitized or sterilized by autoclaving or hot water flushing. Accordingly, the modified membrane must be resistant to this type treatment and must be retain its integrity in use. Any modification to the filter structure, especially brought about by chemical agents which may be unstable under conditions of treatment and use must be scrutinized with care to minimize the prospect of extractables contaminating the filtrate, interfering with analysis and potentially introducing harmful toxins to patients. Specifically any such filter must meet the test standards in the industry, e.g. ASTM D3861-79 (incorporated herein by reference), and generally proved less than 5 mg of extractables and 250 ml solvent (water at 80° C., 35% ethanol at room temperature) for 293 mm diameter disk.

The resulting modified membrane is characterized by retention of internal microstructure, thus offering essentially the same flow characteristics as the untreated membrane.

The modified membrane additionally is easy to handle and readily formed into convoluted structures, e.g. pleated configurations. By reason of its retained flow characteristics it may be employed directly in existing installations, without pumping modifications.

Further, the preferred modified nylon membrane achieves more than 90% reduction in protein binding compared to unmodified nylon membrane; the porosity of the modified nylon membrane was not blocked by the grafted polymer as evidenced from the bubble point test; the modified nylon membrane has improved wettability when exposed to water and other polar solvents evidenced from the lowering of bubble point measurement; the modified nylon membrane has improved mechanical strength due to the presence of grafted acrylics; the modified nylon membrane is steam sterilizable and autoclavable; and it is biologically safe since the extracted levels are extremely low and the acrylic polymers are non-toxic in nature.

The foregoing favorable properties are secured without sacrifice of other desirable characteristics. The membrane may also be constructed to meet or exceed extractable requirements.

The membrane, although preferably in film form, may be in fibrous or hollow fiber configuration.

Filter membranes in accordance with this invention may be employed alone or in combination with other filter media to treat recombinant DNA products, protein based therapeutic and diagnostic products, protein containing buffer solutions, protein chromatography feed and eluates, vaccines and other biological processing solutions, pharmaceuticals such as antibiotics, saline solutions, dextral solutions, vaccines, blood plasma, serums, sterile water or eye washes; beverages such as cordials, gin, vodka, beer, scotch, whiskey, sweet and dry wines, champagne or brandy; cosmetics such as mouth wash, perfume, shampoo, hair tonic, and face creams, and have their use in their main property of preventing the attachment of proteinaceous material to the membrane to thereby undesirably change the composition of the fluid being filtered.

EXAMPLES

EXAMPLE 1

Preparation of Modified Nylon Membrane (1) Preparation of Reactive Polymer Solution A reactive polymer solution was prepared by the following procedure:
(a) 300 ml of dimethyl formamide (DMF) was poured into a 500 ml 4-neck flask, purged with $N_2$ for ½-hour, heated to 60° C. and stirred.
(b) The following monomers were added into the flask: Hydroxypropyl Acrylate (HPA)=28.5 g (95 parts by weight) Glycidyl Methacrylate (GMA)=1.5 g (5 parts by weight) (hereinafter HPA/EMA—95/5)
(c) The mixture was purged for ½-hour with $N_2$.
(d) 1.5% (0.45 G) of azo-bis-isobutylnitrile (AIBN) was added as initiator and the reaction polymerized overnight. (The reaction temperature was kept at 60°–70° C. or 65°–75° C.).

(2) Coating Process (a) The nylon membrane was dipped into the reactive polymer solution for a period of time.
(b) The membrane was removed an excess solvent stripped from the membrane.

(c) The membrane was cured in an oven at 90°–100° C. for one hour. The membrane was weighed and then washed with water.

(d) The membrane was then oven-dried at 60° C. and weighed again.

EXAMPLES 2–21

Modified nylon membranes produced in accordance with the general procedures of Example 1 were used in the following examples. Generally, the protein binding capacity of modified nylon membrane was determined by several methods:

(1) Static Method

The membrane to be tested was immersed in a C-14 labeled bovine serum albumin (BSA) solution with shaking for a period of time. The unbound radioactive protein solution was counted by a Beckman LS-7000 Scintillation System.

(2) Dynamic Flow Test

Protein solutions were passed through the modified membrane under different test conditions, i.e., different pH, different salt concentrations, different test proteins, (i.e., BSA, IgG), different flow rates, different protein concentrations, different volumes of protein solutions, different types of nylon membranes (i.e. 0.2 $\mu$ single layer, 0.2 $\mu$ double layer, 0.45 $\mu$ double layer, 0.65 $\mu$ reinforced nylon membrane and a competitor's 0.2 $\mu$ double layer membrane [Pall Bio-Inert]), and autoclave tests, etc. The unbound protein solution concentration was analyzed by Lowry assay method.

EXAMPLE 2

EFFECT OF MEMBRANE PORE SIZE ON PROTEIN BINDING

The nylon membranes were modified with the modifying polymer (HPA/GMA=95/5) solution. The Dynamic Flow Test was used to test the membrane. (flow rate: 5 ml/min.; 47 mm disk; filtration area: 15.135 cm$^2$; pH 5.2 acetate buffer with 0.1 M NaCl; volume of BSA solution: 75 ml; concentration of BSA solution: 84.92 $\mu$g/ml)

TABLE 1

| Type of Membrane | Conc. of unbound BSA solution ($\mu$g/ml) | Conc. of bound BSA solution ($\mu$g/ml) | % bound |
|---|---|---|---|
| Control nylon membrane (single layer, 0.2 $\mu$) | 77.78 | 7.14 | 8.41 |
| Modified nylon membrane (single layer, 0.2 m) | 82.78 | 2.14 | 2.52 |
| Control nylon membrane (double layer, 0.2 $\mu$) | 78.50 | 6.42 | 7.56 |
| Modified nylon membrane (double layer, 0.2 $\mu$) | 82.78 | 2.14 | 2.52 |
| Control nylon membrane (double layer, 0.45 $\mu$) | 77.07 | 7.85 | 9.24 |
| Modified nylon membrane (double layer, 0.45 $\mu$) | 79.21 | 5.71 | 6.72 |
| Control nylon membrane (reinforced single layer, 0.65 $\mu$) | 80.64 | 4.28 | 5.04 |
| Modified nylon membrane (reinforced single layer, 0.65 $\mu$) | 82.07 | 2.85 | 3.36 |

EXAMPLE 3

EFFECT OF MEMBRANE PORE SIZE ON PROTEIN BINDING

The nylon membranes were modified with the reactive polymer (HPA/GMA=95/5) solution. The Dynamic Flow Test was used to test the membrane. (flow rate: 5 ml/min.; 47 mm disk; filtration area: 15.135 cm$^2$; pH 7.2 phosphate buffer with 0.1 M NaCl; volume of IgG solution: 75 ml concentration of IgG solution: 104.99 $\mu$g/ml)

TABLE 2

| Type of Membrane | Amt. of IgG Applied ($\mu$g) | Amt. of IgG Bound ($\mu$g) | % bound |
|---|---|---|---|
| Control nylon membrane (single layer, 0.2 $\mu$) | 7874.25 | 1259.25 | 15.99 |
| Modified nylon membrane (single layer, 0.2 $\mu$) | 7874.25 | 792.75 | 10.07 |
| Control nylon membrane (double layer, 0.2 $\mu$) | 7874.25 | 1866.00 | 23.70 |
| Modified nylon membrane (double layer, 0.2 $\mu$) | 9337.50 | 855.00 | 9.16 |
| Control nylon membrane (double layer, 0.45 $\mu$) | 7874.25 | 1632.75 | 20.74 |
| Modified nylon membrane (double layer, 0.45 $\mu$) | 7874.25 | 653.25 | 8.30 |
| Control nylon membrane (reinforced single layer, 0.65 $\mu$) | 7874.25 | 1492.50 | 18.95 |
| Modified nylon membrane (reinforced single layer, 0.65 $\mu$ | 7874.25 | 746.25 | 9.48 |

EXAMPLE 4

THE EFFECT OF PROTEIN CONCENTRATION ON PROTEIN BINDING

The nylon membranes were modified with the modifying polymer (HPA/GMA=95/5) solution. The Dynamic Flow Test was used to test the membrane. (flow rate: 5 ml/min.; 47 mm disk; filtration area: 15.135 cm$^2$; 75 ml of IgG solution in phosphate buffer at pH 7.2 with 0.1 M NaCl)

TABLE 3

| Type of Membrane | Conc. of IgG solution ($\mu$g/ml) | Amt. of IgG applied ($\mu$g) | Amt. of IgG bound ($\mu$g) | % bound |
|---|---|---|---|---|
| modified nylon membrane (single layer, 0.2 $\mu$) | 115.0 | 8625.0 | 750.0 | 8.70 |
| modified nylon membrane (single layer, 0.2 $\mu$) | 615.0 | 46125.0 | 4650.0 | 10.08 |
| modified nylon membrane (double layer, 0.2 $\mu$) | 124.5 | 9337.5 | 855.0 | 9.16 |
| modified nylon membrane (double layer, 0.2 $\mu$) | 565.0 | 42375.0 | 1137.5 | 2.68 |
| modified nylon membrane (single layer reinforced, 0.65 $\mu$) | 124.5 | 9337.5 | 912.5 | 9.77 |
| modified nylon membrane (single layer reinforced, 0.65 $\mu$) | 565.0 | 42375.0 | 1850.0 | 4.37 |

EXAMPLE 5

EFFECT OF CONCENTRATION OF BSA SOLUTION ON PROTEIN BINDING

A 0.45 μ single layer nylon membrane was modified with the modifying polymer HPA/GMA=95/5 at room temperature for one hour. The Dynamic Flow Test was used to test the membrane. (flow rate: 5 ml/min.; 47 mm disk; filtration area: 15.135 cm$^2$; one pass of 25 ml of different concentrations of BSA solution at pH 7.2 phosphate buffer with 0.1 M NaCl)

TABLE 4

| Type of Membrane | Conc. of BSA solution (μg/ml) | Amt. of BSA applied (μg) | Amt. of BSA bound (μg) | % bound |
|---|---|---|---|---|
| control nylon membrane | 25.20 | 630.00 | 70.00 | 11.11 |
| modified nylon membrane | 25.20 | 630.00 | ~0 | ~0 |
| control nylon membrane | 89.96 | 2249.00 | 330.75 | 14.71 |
| modified nylon membrane | 89.96 | 2249.00 | 191.50 | 8.51 |
| control nylon membrane | 373.78 | 9344.50 | 1532.00 | 16.39 |
| modified nylon membrane | 373.78 | 9344.50 | 905.25 | 9.69 |

EXAMPLE 6

EFFECT OF CONCENTRATION OF IgG SOLUTION ON PROTEIN BINDING

A 0.45 μ single layer nylon membrane was modified with the modifying reactive polymer HPA/GMA=95/5. The Dynamic Flow Test was used to test the membrane. (flow rate: 5 ml/min.; 47 mm disk; filtration area: 15.135 cm$^2$; one pass of 25 ml of different concentration of IgG solution at pH 7.2 in phosphate buffer without saline)

TABLE 5

| Type of Membrane | Conc. of IgG solution (μg/ml) | Amt. of IgG applied (μg) | Amt. of IgG bound (μg) | % bound |
|---|---|---|---|---|
| control nylon membrane | 27.5 | 687.5 | 312.5 | 45.45 |
| modified nylon membrane | 27.5 | 687.5 | 50.0 | 7.27 |
| control nylon membrane | 100.0 | 2500.0 | 1375.0 | 55.00 |
| modified nylon membrane | 100.0 | 2500.0 | 237.5 | 9.50 |
| control nylon membrane | 440.0 | 11000.0 | 3500.0 | 31.82 |
| modified nylon membrane | 440.0 | 11000.0 | 1500.0 | 13.64 |

EXAMPLE 7

EFFECT OF CONCENTRATION OF IgG SOLUTION ON PROTEIN BINDING

A 0.45 μ single layer nylon membrane was modified with the modifying polymer HPA/GMA=95/5. The Dynamic Flow Test was used to test the membrane. (flow rate: 5 ml/min.; 47 mm disk; filtration area: 15.135 cm$^2$; one pass of 25 ml of different concentration of IgG solution at pH 7.2 phosphate buffer with 0.1 M NaCl)

TABLE 6

| Type of Membrane | Conc. of IgG solution (μg/ml) | Amt. of IgG applied (μg) | Amt. of IgG bound (μg) | % bound |
|---|---|---|---|---|
| control nylon membrane | 27.5 | 687.5 | 375.0 | 54.55 |
| modified nylon membrane | 27.5 | 687.5 | 12.5 | 1.82 |
| control nylon membrane | 108.5 | 2712.5 | 1112.5 | 41.01 |
| modified nylon membrane | 108.5 | 2712.5 | 325.0 | 11.98 |
| control nylon membrane | 444.0 | 11100.0 | 3300.0 | 29.73 |
| modified nylon membrane | 444.0 | 11100.0 | 1650.0 | 14.86 |

EXAMPLE 8

PHYSICAL CHARACTERISTICS OF MODIFIED NYLON MEMBRANE

The nylon membranes (0.45 μ) were modified with a modified polymer solution HPA/GMA or HEA/GMA with different monomer ratios (by weight).

TABLE 7

| Sample | Flow Rate at 5 psi (ml/min) | IBP (psi) | FAOP (psi) |
|---|---|---|---|
| Control nylon membrane | 82 | 43.0 | 44.0 |
| Nylon membrane modified with | | | |
| HPA/GMA (99/1) | 78 | 35.0 | 35.5 |
| HEA/GMA (99/1) | 78 | 40.0 | 40.0 |
| HPA/GMA (95/5) | 90 | 28.0 | 28.0 |
| HEA/GMA (95/5) | 80 | 40.0 | 40.0 |
| HPA/GMA (90/10) | 70 | 37.5 | 37.5 |
| HEA/GMA (90/10) | 82 | 40.5 | 40.5 |

HPA -- Hydroxypropyl Acrylate
HEA -- 2-Hydroxyethyl Acrylate
GMA -- Glycidyl Methacrylate
IBP -- Initial Bubble Point
FAOP -- Foam-All-Over-Point The measurement of membrane bubble point directly reflects the wettability of the membrane surfaces. The lowering of the bubble point of the modified membrane relates to the improved surface wettability of the membrane produced by such modification.

EXAMPLE 9

PROTEIN BINDING TEST BY C-14 LABELED BSA FOR NYLON MEMBRANES MODIFIED WITH HEA/GMA OR HPA/GMA

The following procedure was followed to determine BSA binding by the static method:

1. Prepare 10 μg/ml of C-14 labeled BSA "hot" stock solution in 10 mM phosphate buffer pH 7.2.
2. Prepare 10 mg/ml of BSA "cold" stock solution in 10 mM phosphate buffer pH 7.2.
3. Mix 0.5 ml "hot" BSA solution and 2.5 ml "cold" BSA solution together in 100 ml of 10 mM phosphate buffer to get 250 μg/ml of BSA working solution with activity=2423.40 cpm/ml, specific activity=9.6936 cpm/μg of BSA.
4. A 47 mm nylon membrane disk was placed in a 250 ml of beaker.
5. The radioactive BSA solution (10.0 ml) was pipetted into the beaker, then agitated on an orbital shaker for 19 hours.

6. 1 ml of aliquots of unbound BSA solution was counted for 10 min. by a Beckman LS 7500 Liquid Scintillation system.
7. 34.70 cm$^2$ of membrane area was used to calculate the BSA bound/Area ($\mu$g/cm$^2$).

LOW PROTEIN BINDING TEST RESULT BY C-14 LABELED BSA FOR NYLON MEMBRANES MODIFIED WITH HEA/GMA OR HPA/GMA REACTIVE POLYMER SOLUTION PREPARED AT DIFFERENT TEMPERATURE WITH VARIED MONOMER RATIO

The nylon membranes were dipped into a modifying polymer solution for different times (1 min., 5 min., 1 hr.), then, the membrane was oven-cured at 90°-100° C. for 1 hour, water-washed, oven-dried, and autoclaved for 1 hour. (radioactive BSA solution: 250 $\mu$g/ml; activity=2423.40 cmp/ml; specific activity=9.6936 cpm/$\mu$g, 34.70 cm$^2$ of 0.45 $\mu$ membrane area exposed)

TABLE 8

| Sample | Unbound (cpm/ml) | Unbound BSA ($\mu$g/ml) | Bound BSA ($\mu$g/ml) | Total BSA bound ($\mu$g) | BSA bound/ area ($\mu$g/cm$^2$) |
| --- | --- | --- | --- | --- | --- |
| Control nylon membrane | 1599.65 | 165.02 | 84.98 | 849.8 | 24.49 |
| Control nylon membrane | 1615.35 | 166.64 | 83.36 | 833.6 | 24.02 |
| Nylon membrane modified with: | | | | | |
| HPA/GMA-90/10 (65° C., 1 hr) | 2313.65 | 238.68 | 11.32 | 113.2 | 3.26 |
| HPA/GMA-90/10 (65° C., 1 hr) | 2331.20 | 240.49 | 9.51 | 95.1 | 2.74 |
| HEA/GMA-90/10 (65° C., 1 hr) | 2254.05 | 232.53 | 17.47 | 174.7 | 5.03 |
| HEA/GMA-90/10 (65° C., 1 hr) | 2272.20 | 234.40 | 15.60 | 156.0 | 4.50 |
| HPA/GMA-95/5 (75° C., 1 hr) | 2371.55 | 244.65 | 5.35 | 53.5 | 1.54 |
| HPA/GMA-95/5 (75° C., 1 hr) | 2376.55 | 245.17 | 4.83 | 48.3 | 1.39 |
| HPA/GMA-95/5 (65° C., 1 hr) | 2373.20 | 244.82 | 5.18 | 51.8 | 1.49 |
| HPA/GMA-95/5 (65° C., 1 hr) | 2330.30 | 240.40 | 9.60 | 96.0 | 2.77 |
| HPA/GMA-95/5 (65° C., 1 min) | 2228.30 | 229.87 | 20.13 | 201.3 | 5.80 |
| HPA/GMA-95/5 (65° C., 1 min) | 2337.10 | 241.10 | 8.90 | 89.0 | 2.56 |
| HPA/GMA-95/5 (65° C., 5 min) | 2264.30 | 233.59 | 16.41 | 164.1 | 4.73 |
| HPA/GMA-95/5 (65° C., 5 min) | 2359.55 | 243.41 | 6.59 | 65.9 | 1.90 |

The ratio of 95% HPA to 5% GMA is preferred.

The ratio of 95% HPA to 5% GMA is preferred.

EXAMPLE 10

EFFECT OF POLYMER COMPOSITION AND VOLUME ON PROTEIN BINDING 0.45 $\mu$ nylon membrane (double layer) was modified by HPA/GMA modifying polymer solutions having different monomer ratios (90/10 or 99/1). The Dynamic Flow Test was used to test the membrane. (flow rate: 5 ml/min.; 47 mm disk; filtration area: 15.135 cm$^2$; concentration of IgG solution in pH 7.2 phosphate buffer with 0.1 M NaCl: 118.0 $\mu$g/ml).

TABLE 9

| Sample | Volume (ml) | Amt. of IgG applied ($\mu$g) | Amt. of IgG bound ($\mu$g) | % bound |
| --- | --- | --- | --- | --- |
| Nylon membrane modified by HPA/GMA (90/10) | 25 | 2950.0 | 450.0 | 15.25 |
| Nylon membrane modified by HPA/GMA (90/10) | 50 | 5900.0 | 700.0 | 11.86 |
| Nylon membrane modified by HPA/GMA (90/10) | 150 | 17700.0 | 800.0 | 4.51 |
| Nylon membrane modified by HPA/GMA (99/1) | 25 | 2950.0 | 287.5 | 9.75 |
| Nylon membrane modified by HPA/GMA (99/1) | 50 | 5900.0 | 475.0 | 8.05 |
| Nylon membrane modified by HPA/GMA (99/1) | 150 | 17700.0 | 600.0 | 3.39 |
| Nylon membrane modified by HPA/GMA (95/5) | 25 | 2500.0 | 237.5 | 9.50 |
| Nylon membrane modified by HPA/GMA (95/5) | 50 | 7874.0 | 635.0 | 8.06 |
| Nylon membrane modified by HPA/GMA (95/5) | 150 | 11000.0 | 1500.0 | 13.63 |

EXAMPLE 11

EFFECT OF FLOW RATE ON PROTEIN BINDING 0.45 $\mu$ nylon membranes (double layer) were modified by HPA/GMA (95/5) modifying polymer. (flow rates: 2.5 ml/min.; 5.0 ml/min.; & 10.0 ml/min.; 47 mm disk; filtration area: 15.135 cm$^2$; 75 mil of IgG solution in pH 7.2 phosphate buffer with 0.1 M NaCl).

TABLE 10

| Sample | Conc. of IgG solution ($\mu$g/ml) | Flow Rate (ml/min) | Amt. of IgG applied ($\mu$g) | Amt. of IgG bound ($\mu$g) | % bound |
| --- | --- | --- | --- | --- | --- |
| Control nylon membrane | 103.75 | 2.5 | 7781.25 | 1778.90 | 22.86 |
| Modified nylon | 103.75 | 2.5 | 7781.25 | 715.45 | 9.19 |

TABLE 10-continued

| Sample | Conc. of IgG solution (μg/ml) | Flow Rate (ml/min) | Amt. of IgG applied (μg) | Amt. of IgG bound (μg) | % bound |
|---|---|---|---|---|---|
| membrane | | | | | |
| Control nylon membrane | 101.26 | 5.0 | 7594.50 | 1940.50 | 25.55 |
| Modified nylon membrane | 101.26 | 5.0 | 7594.50 | 659.30 | 8.68 |
| Control nylon membrane | 106.23 | 10.0 | 7967.25 | 1843.60 | 23.14 |
| Modified nylon membrane | 106.23 | 10.0 | 7967.25 | 677.60 | 8.50 |

EXAMPLE 12

EFFECT OF SALT CONCENTRATION ON PROTEIN BINDING

A 0.45 μ single layer nylon membrane was modified with the modifying polymer HPA/GMA 95/5. The Dynamic Flow Test was used to test the membrane. (flow rate: 5 ml/min.; 47 mm disk; filtration area: 15.135 cm$^2$; one pass of 25 ml of IgG solution in 10 mM of phosphate buffer at pH 7.2).

TABLE 11

| Type of Membrane | Conc. of NaCl (M) | Amt. of IgG applied (μg) | Amt. of IgG bound (μg) | % bound |
|---|---|---|---|---|
| Control nylon membrane | 0 | 2662.5 | 1412.5 | 53.05 |
| Modified nylon membrane | 0 | 2662.5 | 300.0 | 11.27 |
| Control nylon membrane | 0.10 | 2662.5 | 1250.0 | 46.95 |
| Modified nylon membrane | 0.10 | 2662.5 | 162.5 | 6.10 |
| Control nylon membrane | 0.25 | 2675.0 | 1325.0 | 49.53 |
| Modified nylon membrane | 0.25 | 2675.0 | 362.5 | 13.55 |
| Control nylon membrane | 0.50 | 2675.0 | 1375.0 | 51.40 |
| Modified nylon membrane | 0.50 | 2675.0 | 375.0 | 14.02 |
| Control nylon membrane | 1.00 | 2637.5 | 1637.5 | 62.09 |
| Modified nylon membrane | 1.00 | 2637.5 | 587.5 | 22.28 |

EXAMPLE 13

EFFECT OF AMOUNT OF POLYMER ON PROTEIN BINDING 0.45 μ nylon membranes were modified by the HPA/GMA (95/5) modifying polymer solution with different dilution (10%, 5%, 2%, 1% by weight of polymer). The Dynamic Flow Test was used to test the membrane.

(Flow rate: 5 ml/min.; 47 mm disk; filtration area: 15.135 cm$^2$; concentration of IgG solution in phosphate buffer at pH 7.2 With 0.1 M NaCl; 89.44 μg/ml; one pass of 75 ml of protein solution)

TABLE 12

| Sample | Weight of Membrane Before Treatment (g) | Weight of Membrane After Treatment (g) | Conc. of IgG Solution, Bound (μg/ml) | % bound |
|---|---|---|---|---|
| Nylon membrane treated with | | | | |
| 10% HPA/GMA reactive polymer | 3.17 | 3.82 | 6.84 | 7.65 |
| 5% HPA/GMA reactive polymer | 3.02 | 3.33 | 10.57 | 11.82 |
| 2% HPA/GMA reactive polymer | 2.93 | 3.04 | 15.55 | 17.39 |
| 1% HPA/GMA reactive polymer | 2.98 | 3.03 | 15.55 | 17.39 |
| Control nylon membrane | | | 25.50 | 28.51 |

FIG. 2 is a graph depicting similar tests on a different membrane (0.45μ double layer).

EXAMPLE 14

STUDY OF PROTEIN (IgG) SATURATION DURING THE FLOW TEST ON THE LOW PROTEIN BINDING MEMBRANE (prepare 800 ml of 93.17 μg/ml of IgG solution in 10 mM of phosphate buffer at pH 7.2 with 0.1 M NaCl; 9 ml of effluent collected in each test tube; 47 mm disk of 0.45 μ double layer modified nylon membrane (HPA/GMA - 95/5) was used; 15.135 cm$^2$ of filtration area.

TABLE 13

| Sample | Conc. of IgG Solution (μg/ml) | Conc. of IgG Solution (bound) (μg/ml) | Total IgG bound in 9 ml aliquot (μg) | area (μg/cm$^2$) | % bound |
|---|---|---|---|---|---|
| Inlet | 93.17 | — | — | — | — |
| 9 ml | 75.14 | 18.03 | 162.27 | 10.72 | 19.35 |
| 45 ml | 87.58 | 5.59 | 50.31 | 3.32 | 6.00 |
| 90 ml | 90.06 | 3.11 | 27.99 | 1.85 | 3.34 |
| 135 ml | 89.44 | 3.73 | 33.57 | 2.22 | 4.00 |
| 180 ml | 90.06 | 3.11 | 27.99 | 1.85 | 3.34 |

TABLE 13-continued

| Sample | Conc. of IgG Solution (μg/ml) | Conc. of IgG Solution (bound) (μg/ml) | Total IgG bound in 9 ml aliquot (μg) | area (μg/cm$^2$) | % bound |
|---|---|---|---|---|---|
| 225 ml | 91.31 | 1.86 | 16.74 | 1.11 | 2.00 |
| 270 ml | 91.31 | 1.86 | 16.74 | 1.11 | 2.00 |
| 315 ml | 91.93 | 1.24 | 11.16 | 0.74 | 1.33 |
| 360 ml | 91.93 | 1.24 | 11.16 | 0.74 | 1.33 |
| 405 ml | 91.31 | 1.86 | 16.74 | 1.11 | 2.00 |
| 450 ml | 91.93 | 1.24 | 11.16 | 0.74 | 1.33 |
| 495 ml | 92.55 | 0.62 | 5.58 | 0.37 | 0.67 |
| 540 ml | 92.55 | 0.62 | 5.58 | 0.37 | 0.67 |
| 585 ml | 92.55 | 0.62 | 5.58 | 0.37 | 0.67 |
| 630 ml | 92.55 | 0.62 | 5.58 | 0.37 | 0.67 |
| 675 ml | 92.55 | 0.62 | 5.58 | 0.37 | 0.67 |
| 720 ml | 93.17 | 0 | 0 | 0 | 0 |

EXAMPLE 15

EFFECT OF pH ON PROTEIN BINDING 0.45 μ nylon membranes (double layer) were modified with the HPA/GMA (95/5) reactive polymer.

Test conditions:

Concentration of BSA solution in acetate buffer with 0.1 M NaCl at pH 5.2: 107.37 μg/ml Concentration of BSA solution in phosphate buffer with 0.1 M NaCl at pH 7.2: 109.46 μg/ml Concentration of BSA solution in borate buffer with 0.1 M NaCl at pH 9.0: 115.25 μg/ml Flow rate: 5 ml/min.; filtration area: 15.135 cm$^2$; 47 mm disk used.

TABLE 14

| | % bound for control nylon membrane at different volumes | | | % bound for modified nylon membrane at different volumes | | |
|---|---|---|---|---|---|---|
| | 25 ml | 50 ml | 150 ml | 25 ml | 50 ml | 150 ml |
| at pH 5.2 | 16.21 | 7.13 | ~0 | 9.08 | 1.29 | ~0 |
| at pH 7.2 | 17.18 | 7.64 | 3.82 | 12.10 | 5.73 | ~0 |
| at pH 9.0 | 17.56 | 10.90 | 6.66 | 15.14 | 9.08 | 4.24 |

EXAMPLE 16

EFFECT OF pH ON PROTEIN BINDING 0.45 μ nylon membranes (double layer) were modified with the HPA/GMA (95/5) reactive polymer.

Test conditions: Concentration of IgG solution in acetate buffer with 0.1 M NaCl at pH 5.1: 107.5 μg/ml Concentration of IgG solution in phosphate buffer with 0.1 M NaCl at pH 7.2: 125.0 μg/ml Concentration of IgG solution in borate buffer with 0.1 M NaCl at pH 9.0: 125.0 μg/ml Flow rate: 5 ml/min.; filtration area: 15.135 cm$^2$; 47 mm disk used.

TABLE 15

| | % bound for control nylon membrane at different volumes | | | % bound for modified nylon membrane at different volumes | | |
|---|---|---|---|---|---|---|
| | 25 ml | 50 ml | 150 ml | 25 ml | 50 ml | 150 ml |
| at pH 5.1 | 58.60 | 31.63 | 20.93 | 20.47 | 12.56 | 8.84 |
| at pH 7.2 | 34.00 | 21.20 | 8.80 | 14.00 | 0.40 | ~0 |
| at pH 9.0 | 32.00 | 20.80 | 1.60 | 1.60 | ~0 | ~0 |

Figure 3:
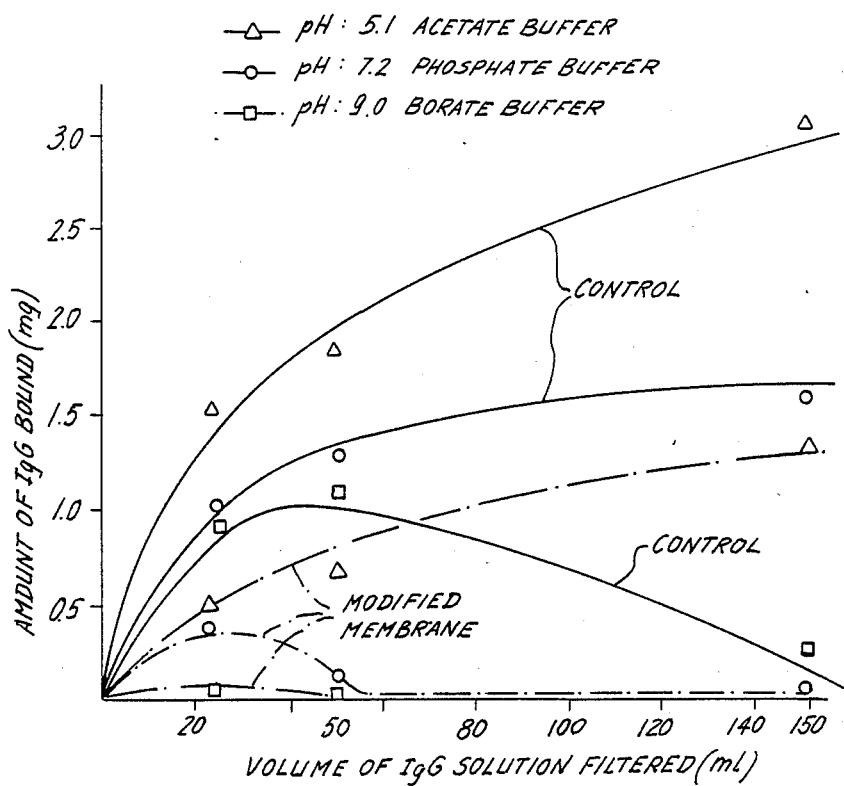
FIG. 3 is a graph entitled "Effect of pH on IgG Binding to Membrane"; see Example 16.
Figure 4:
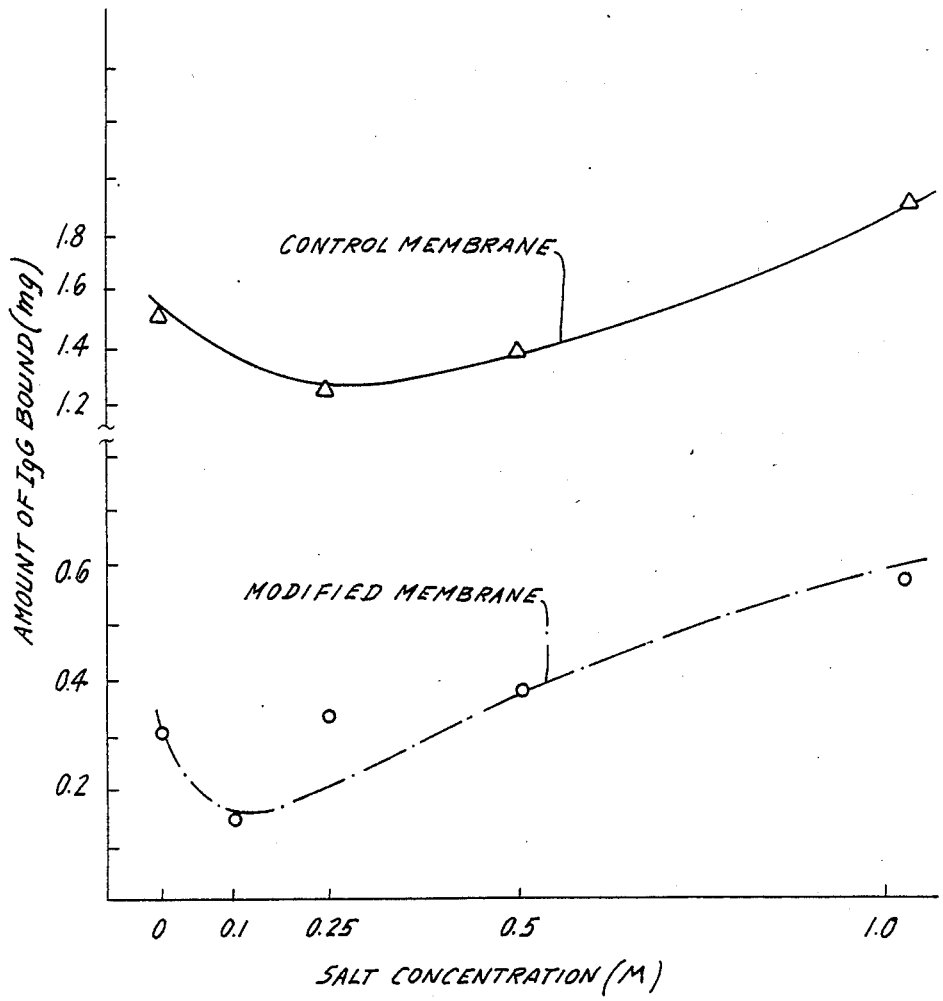
FIG. 4 is a graph entitled "Effect of Salt on Protein Binding by Membrane"; see Example 12.
Figure 5:
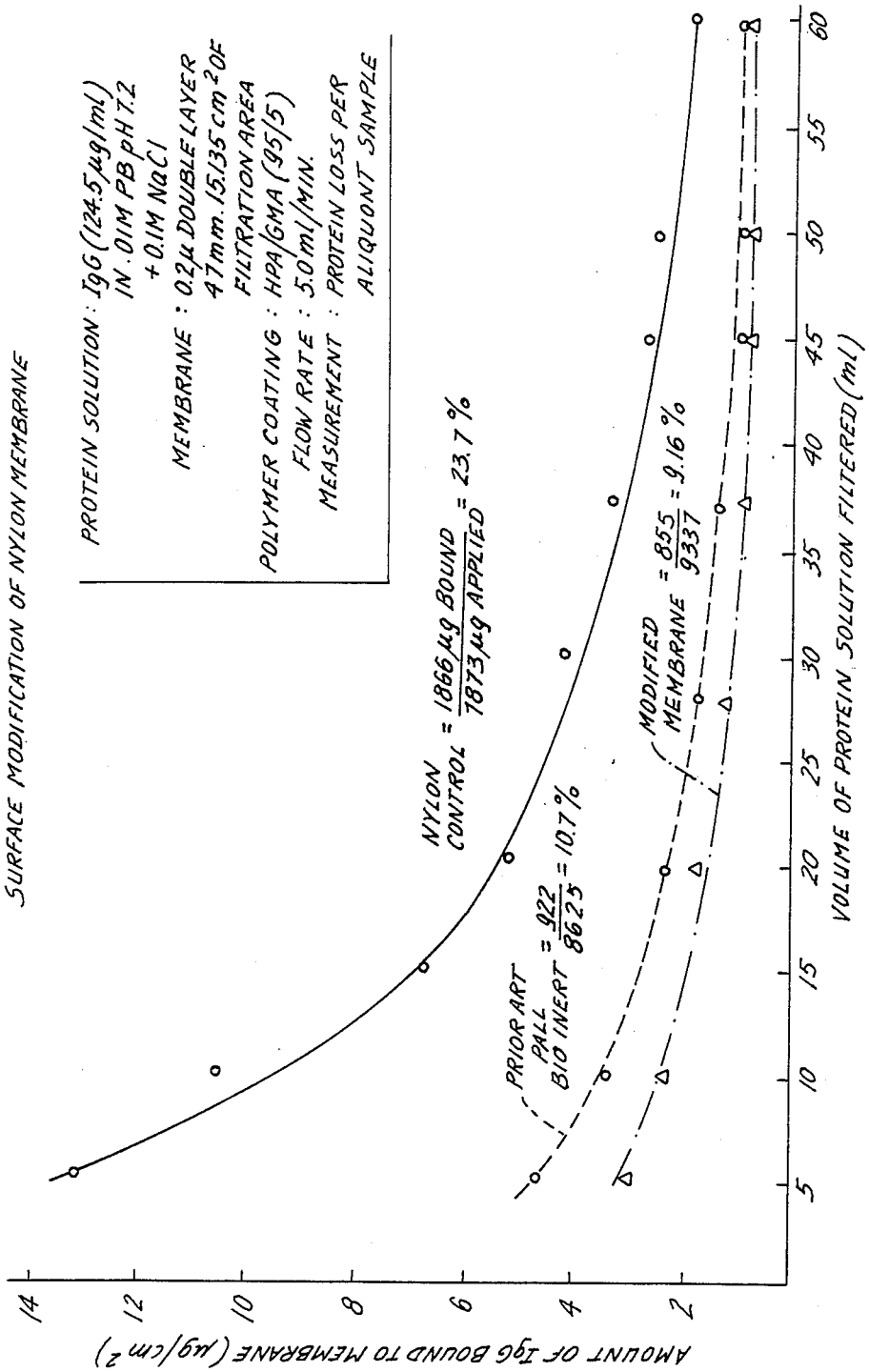
FIG. 5 is a graph entitled "Surface Modification of Nylon Membrane".
Figure 6:
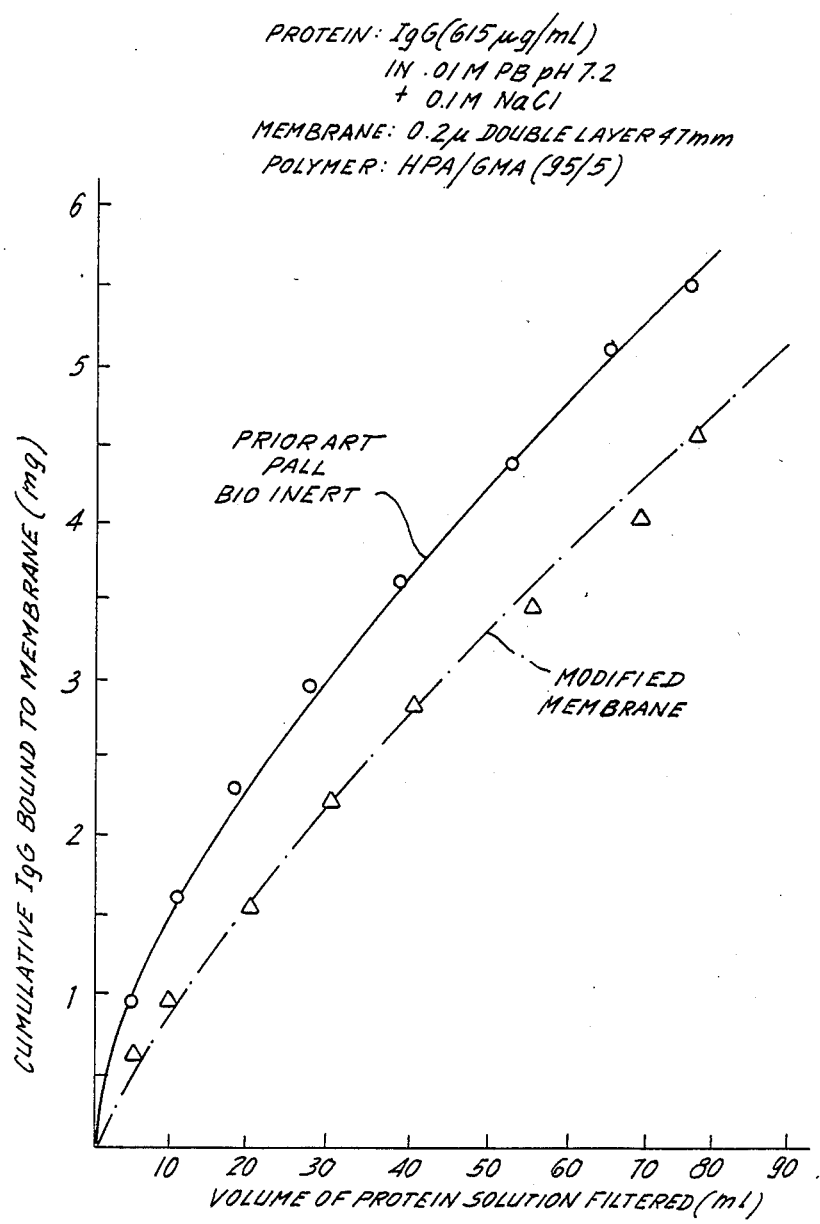
FIG. 6 is a graph entitled "Comparison of Prior Art Pall Bio-Inert vs. Modified Membrane".

FIG. 3 is a graph depicting similar tests.

EXAMPLE 17

EFFECT OF NATURE OF DIFFERENT PROTEINS ON BINDING

The nylon membranes (0.45 μ, double layer) were modified with the HPA/GMA (95/5) modifying polymer. Thyroglobulin molecular weight 660,000; P$^I$: 4.5 The concentration of Thyroglobulin II Porcine in acetate buffer at pH 3.3: 106.11 μg/ml The concentration of Thyroglobulin II Porcine in acetate buffer at pH 4.5: 100.43 μg/ml The concentration of Thyroglobulin II Porcine in phosphate buffer at pH 7.2: 115.20 μg/ml One pass of 75 ml of protein solution.

TABLE 16

| Sample | Amount of Protein Applied (μg) | Amount of Protein Bound (μg) | % bound |
|---|---|---|---|
| control nylon membrane at pH 3.3 | 7958.25 | 5025.75 | 63.15 |
| modified nylon membrane at pH 3.3 | 7958.25 | 3322.50 | 41.75 |
| control nylon membrane at pH 4.5 | 7532.25 | 4429.50 | 58.81 |
| modified nylon membrane at pH 4.5 | 7532.25 | 2194.50 | 29.13 |
| control nylon membrane at pH 7.2 | 8640.00 | 2640.75 | 30.56 |
| modified nylon membrane at pH 7.2 | 8640.00 | 766.50 | 8.87 |

EXAMPLE 18

EFFECT OF NATURE OF DIFFERENT PROTEINS ON BINDING

The nylon membranes (0.45 μ, double layer) were modified with the HPA/GMA (95/5) modifying polymer. Cytochrome c molecular weight 12,384 p$^I$ 9.28 at 25 C The concentration of Cytochrome c in phosphate buffer at pH 7.2: 97.69 μg/ml The concentration of Cytochrome c in borate buffer at pH 9.2: 94.92 μg/ml The concentration of Cytochrome c in borate buffer at pH 10.5: 103.21 μg/ml

TABLE 17

| Sample | Amount of Protein Applied (μg) | Amount of Protein Bound (μg) | % bound |
|---|---|---|---|
| Control nylon membrane at pH 7.2 | 7326.75 | 311.25 | 4.25 |
| Modified nylon membrane at pH 7.2 | 7326.75 | 311.25 | 4.25 |
| Control nylon membrane at pH 9.2 | 7119.00 | 570.00 | 8.01 |
| Modified nylon membrane at pH 9.2 | 7119.00 | 310.50 | 4.36 |
| Control nylon membrane at pH 10.5 | 7740.75 | 725.25 | 9.37 |
| Modified nylon membrane | 7740.75 | 725.25 | 9.37 |

| Sample | Amount of Protein Applied (μg) | Amount of Protein Bound (μg) | % bound |
|---|---|---|---|
| at pH 10.5 | | | |

EXAMPLE 19
EFFECT OF NATURE OF DIFFERENT PROTEINS ON BINDING

The nylon membranes (0.45 μ, double layer) were modified with the HPA/GMA (95/5) modifying polymer. Albumin molecular weight 69,000 $p^I$ 4.90 The concentration of BSA in acetate buffer at pH 4.0: 81.34 μg/ml The concentration of BSA in acetate buffer at pH 5.2: 81.34 μg/ml The concentration of BSA in phosphate buffer at pH 7.2: 82.75 μg/ml one pass of 75 ml of protein solution.

TABLE 18

| Sample | Amount of Protein Applied (μg) | Amount of Protein Bound (μg) | % bound |
|---|---|---|---|
| Control nylon membrane at pH 4.0 | 6100.50 | 742.50 | 12.17 |
| Modified nylon membrane at pH 4.0 | 6100.50 | 371.25 | 6.09 |
| Control nylon membrane at pH 5.2 | 6100.50 | 477.00 | 7.82 |
| Modified nylon membrane at pH 5.2 | 6100.50 | 0 | 0 |
| Control nylon membrane at pH 7.2 | 6206.25 | 582.75 | 9.39 |
| Modified nylon membrane at pH 7.2 | 6206.25 | 423.75 | 6.83 |

EXAMPLE 20
EFFECT OF DIFFERENT GRAFTING METHODS ON PROTEIN BINDING 0.45 μ nylon membranes (double layer) were modified with HPA or HPA/GMA polymer by UV-photografting in DMF with benzophenone as photosensitizer. The Dynamic Flow Test was used to test the membrane.

(flow rate: 5 ml/min.; 47 mm disk; 15.135 cm² of filtration area; concentration of IgG solution in phosphate buffer with 0.1 M NaCl at pH 7.2: 121.0 μg/ml)

TABLE 19

| Sample | Volume of IgG Solution (ml) | Conc. of IgG in Effluent (μg/ml) | Conc. of IgG Bound (μg/ml) | % bound |
|---|---|---|---|---|
| Nylon membrane modified with HPA | 25 | 108.0 | 13.0 | 10.74 |
| with HPA/GMA (95/5) | 25 | 110.0 | 11.0 | 9.09 |
| Nylon membrane modified with HPA | 50 | 111.0 | 10.0 | 8.26 |
| with HPA/GMA (95/5) | 50 | 114.0 | 7.0 | 5.79 |
| Nylon membrane modified with HPA | 150 | 116.5 | 4.5 | 3.72 |
| with HPA/GMA (95/5) | 150 | 121.0 | ~0 | ~0 |

EXAMPLE 21
EFFECT OF DIFFERENT FORMULATION ON PROTEIN BINDING 0.45 μ nylon membranes were modified with different formulations. The Dynamic Flow Test was used to test the membrane. (flow rate: 5 ml/min.; 47 mm disk; 15.135 cm² of filtration area, one pass of 75 ml of IgG solution in phosphate buffer with 0.1 M NaCl; 83 μg/ml IgG dissolved in 10 mM buffer at pH 7.2)

TABLE 20

| Sample | Amt. of IgG Applied (μg) | Amt. of IgG Bound (μg) | % bound |
|---|---|---|---|
| control nylon membrane | 6288.00 | 1259.25 | 20.03 |
| modified nylon membrane with | | | |
| HEMA/MAA/GMA (79:20:1, by weight) | 6288.00 | 1165.50 | 18.54 |
| HEMA/GMA (99:1, by weight) | 6288.00 | 839.25 | 13.35 |
| HEMA/GMA (0.1 M/0.05M) | 6288.00 | 1445.25 | 22.98 |
| HEMA/GMA (0.05 M/0.05M) | 6288.00 | 839.25 | 13.35 |
| HEMA-5/GMA (95:5, by weight) | 6288.00 | 606.00 | 9.64 |
| HPA/GMA/β- CEA (19:1:1, by weight | 7967.25 | 951.15 | 11.94 |
| HPA/GMA/DEAE (19:1:1, by weight | 7967.25 | 954.80 | 11.98 |
| HPA/GMA (95:5, by weight, N-methyl-2-pyrrolidone as solvent) | 7687.50 | 799.00 | 10.39 |
| HPA/GMA (95:5, by weight, DMF as solvent) | 7874.25 | 653.25 | 8.30 |

| Sample | Amt. of IgG Applied (μg) | Amt. of IgG Bound (μg) | % bound |
|---|---|---|---|
| HEMA-10/GMA (95:5, by weight DMF as solvent) | 6941.25 | 792.69 | 11.42 |
| Propylene glycol monoacrylate/GMA(95:5, by wgt) EXAMPLE 21 (cont) | 6941.25 | 698.98 | 10.07 |

MAA — methacrylic acid
HEMA — Hydroxyethyl Methacrylate
HEA — 2 - Hydroxyethyl Acrylate
GMA — Glycidyl Methacrylate
HPA — 3-hydroxypropyl Acrylate
β-CEA — β-carboxy ethyl acrylate These results indicate that both HPA and HEMA are effective in reducing protein binding to nylon microporous membrane.

EXAMPLE 22

EFFECT OF MEMBRANE MODIFICATION ON MEMBRANE STABILITY

The chemical attack of the amide groups in nylon by oxidizin species produced in chlorinated water and oxygen radicals from ozon often destroys membrane stability. The protection provided by th grafted modifying polymer inhibits the rapid decay of the membran structure in the presence of oxidizing species.

Membrane strength was tested by injecting 10% fat emulsion o intra lipid from Kabi Vitrum until the membrane burst. The results are as follows:

| Membrane Sample | Sample Condition | Burst Pressure (Bar) |
|---|---|---|
| (0.45 μ, nylon membrane) | | |
| Control | Dry | 5.0 |
| Modified | Dry | 7.5 |
| Control | Pre-wetted | 6.0 |
| Modified | Pre-wetted | 8.5 |

Conclusion

The glass transition temperature of nylon-6 (62.5° C.) or nylon-66 (45° C.) is higher than room temperature. Thus at room temperature, the nylon membrane exhibits brittleness.

The glass transition temperature of hydroxyalkyl acrylates, HPA ($-7°$ C.) or HEA ($-15°$ C.) is lower than room temperature. Thus at roo temperature, the hydroxyalkyl acrylate polymer will be more elastic.

Therefore, the grafting of the more elastic hydroxyalkyl acrylat polymer onto nylon membrane will impart to the nylon membran additional elastic strength at room temperature.

What is claimed is:

1. A method of producing a modified microporous membrane having microporous surfaces comprising causing said surfaces to have properties sufficient to substantially preclude binding thereto of protenaceous when in use by applying to an organic polymeric microporous membrane having hydroxyl, mercapto carboxyl or amino functionality on the microporous surfaces thereof a reactive modifying polymer having a polymer chain and having along the polymer chain epoxy or epithio groups for reacting with the functionality of the membrane and terminal neutral chemical functionality.

2. The method of claim 1, wherein the neutral chemical functionality is selected from the group consisting of hydroxyl, amide, alkyl and aryl functionality.

3. The method of claim 1, wherein the reactive modifying polymer is made from a free radical polymerization of:
   (a) a polymerizable compound containing an epoxy or epithio group capable of direct covalent coupling to the surface functionalities of the microporous membrane and a vinyl group capable of free radical polymerization; and
   (b)

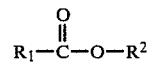

wherein $R_1$ is an alpha, beta ethylenically unsaturated polymerizable radical of two or three carbon atoms;
   $R_2$ is an alkyl substituent of two to five carbon atoms having a terminal hydroxyl functionality or $(R_3O)_nH$,
   wherein $R_3$ is an alkyl substituent of two or three carbon atoms and n is 1 to 20.

4. The method of claim 3, wherein (a) is glycidyl methacrylate or glycidyl acrylate.

5. The method of claim 3, wherein (a) is N-acryloyloxysuccinimide or N-methacryloyloxysuccinimide.

6. The method of claim 3, wherein (b) is 2-hydroxyacrylate.

7. The method of claim 3, wherein (b) is 3-hydroxy propyl acrylate or its isomers.

8. The method of claim 3, wherein (b) is 3-hydroxyethyl-methacrylate.

9. The method of claim 1, wherein the microporous membrane is nylon 66.

10. The method of claim 9, wherein the step of applying comprises cocasting the reactive modifying polymer with the organic polymer to form the modified microporous membrane.

11. The method of claim 1, wherein the step of applying comprises contacting the membrane with a solution of the reactive modifying polymer followed by curing.

12. The method of claim 1, wherein the neutral chemical functionality is hydroxyl.

13. The method of claim 1 in the form of a hollow fiber.

* * * * *